United States Patent
Izumi et al.

[11] Patent Number: 6,160,673
[45] Date of Patent: Dec. 12, 2000

[54] DIGITAL RECORDING/REPRODUCTION APPARATUS INCLUDING A DIGITAL EQUALIZER CIRCUIT WITH OPEN-LOOP CONTROL

[75] Inventors: Naoji Izumi, Narashino; Hironobu Katayama, Noda, both of Japan

[73] Assignee: Sharp Kabushiki Kaisha, Osaka, Japan

[21] Appl. No.: 09/014,936

[22] Filed: Jan. 28, 1998

[30] Foreign Application Priority Data

Jan. 28, 1997 [JP] Japan .................................. 9-014102

[51] Int. Cl.⁷ ...................................................... G11B 5/09
[52] U.S. Cl. .............................. 360/46; 360/65; 708/32; 375/232
[58] Field of Search .................................. 360/65, 27, 46, 360/51, 45; 375/232, 231; 708/323, 319

[56] References Cited

U.S. PATENT DOCUMENTS

| | | | |
|---|---|---|---|
| 5,274,512 | 12/1993 | Tanaka et al. | 360/65 |
| 5,276,517 | 1/1994 | Matsuzawa et al. | 360/654 |
| 5,414,571 | 5/1995 | Matsushige et al. | |
| 5,450,253 | 9/1995 | Seki et al. | 360/65 |
| 5,586,144 | 12/1996 | Kahlman et al. | |
| 5,886,844 | 3/1999 | Shimuzu | 360/65 |

FOREIGN PATENT DOCUMENTS

| | | |
|---|---|---|
| 0 332 079 | 9/1989 | European Pat. Off. . |
| 5-314653 | 11/1993 | Japan . |
| 7-75064 | 3/1995 | Japan . |

OTHER PUBLICATIONS

"Generalization of a Technique for Binary Data" by E.R. Kretzmer; IEEE Transactions on Communications Technology, vol. Com–14(1) ; pp. 67–68, Feb. 1966.

K. Yokoyama, Introduction to the Magnetic Recording, published by Sogo Denshi Shuppan, Tokyo,Japan. (1988) pp. 305–307.

*Patent Abstracts of Japan,* vol. 96, No. 7, Jul. 31, 1996 & JP 08 069606 A (NEC Corp.), Mar. 12, 1996, Abstract.

*Primary Examiner*—Alan T. Faber
*Attorney, Agent, or Firm*—Dike, Bronstein, Roberts & Cushman, LLP; David G. Conlin; William J. Daley, Jr.

[57] ABSTRACT

The waveform equalizer comprises equalizing means for equalizing the waveform of the reproduction signal based on the equalizing coefficient, reference signal-generating means for extracting an isolated wave from the reproduction signal to generate a reference signal based on the isolated wave and equalizing coefficient control means for carrying out an operation of the equalizing error of the isolated wave of the reproduction signal whose waveform has been equalized by the equalizing means from the reference signal, to control the equalizing coefficient based on the equalizing error, wherein the reference signal is generated based on the reproduction signal, and the equalizing coefficient is determined in response to the reproduction signal using this reference signal.

24 Claims, 10 Drawing Sheets

Spectrum at the detection point (point e)

DIGITAL RECORDING/REPRODUCTION APPARATUS INCLUDING A DIGITAL EQUALIZER CIRCUIT WITH OPEN-LOOP CONTROL

BACKGROUND OF THE INVENTION (1) Field of the Invention

The present invention relates to a waveform equalizer which equalizes the waveform of the signal reproduced from record media such as magnetic tapes, disks and the like, and a digital recording/reproduction apparatus including this waveform equalizer.

(2) Description of the Prior Art

The digital recording/reproduction apparatus such as a digital VTR (Video Tape Recorder) which performs recording and reproduction at high density and at high quality have currently been put to practical use in the field of the business broadcasting, and for the domestic use, the one of the first generation will soon be put on the market. In general, with such a digital recording/reproduction apparatus, a waveform distortion is caused in the signal due to the interference between the codes on the signal transmission path. Therefore, the waveform equalizer removes the distortions in signals read from the recording media caused in the transmission path and subjects the signal to the decoding processing.

Hereinafter, the prior art will be described taking the digital recording/reproduction apparatus which uses a magnetic tape as the recording medium as an example, with reference to FIG. 1 to FIG. 4.

The digital recording/reproduction apparatus shown in FIG. 1 comprises a head 1 for detecting the digital signal recorded in the magnetic tape (not shown); a rotary transformer 2 for transmitting a reproduction signal obtained by the detection with the head 1; a reproduction amplifier 3 for amplifying the reproduction signal transmitted from the rotary transformer 2; a fixed waveform equalizing circuit 4 for equalizing the waveform of the amplified reproduction signal; a clock generating circuit 9 comprising PLL (Phase Locked Loop) for generating a master clock signal; a detection circuit 11 for detecting a digital signal by converting the waveform-equalized reproduction signal into a binary format; a demodulation circuit 12 for demodulating the detected reproduction signal; and an error-correction circuit 13 for correcting errors in the demodulated reproduction signal.

With the conventional digital recording/reproduction apparatus having such a structure, the signal recorded in the magnetic tape is picked up as a reproduction signal by the head 1, and is input to the reproduction amplifier 3 via the rotary transformer 2. This reproduction amplifier 3 amplifies the reproduction signal and outputs the amplified reproduction signal to the fixed waveform equalizing circuit 4. Here, the fixed waveform equalizing circuit 4 comprises a phase compensation circuit 41 and an amplitude compensation circuit 42, and the phase compensation circuit 41 and the amplitude compensation circuit 42 compensate the phase characteristic and the amplitude characteristic, respectively, to equalize the waveform distorted due to the interference between the codes, hence the distortions in the amplitude and the phase are removed to improve the quality of the signal.

Thus waveform-equalized reproduction signal is output to the detection circuit 11 and the clock generation circuit 9. The clock generation circuit 9 generates a master clock signal for synchronizing the motions of the whole reproduction system from the input reproduction signal. The detection circuit 11 converts the reproduction signal into a binary format based on this master clock signal and detects the digital signal. Here, the sampling cycle when the reproduction signal is converted into the binary format is defined as the "bit cycle". Thus detected digital signal is demodulated to the digital signal of before the modulation which is performed at the time of recording in the recording medium by the demodulation circuit 12. The error correction circuit 13 corrects the error in the demodulated digital signal and outputs the corrected digital signal.

The detection method with the above-mentioned detection circuit 11 will now be described. The NRZI modulation has been generally used as the modulation method when a digital signal is recorded on the recording medium. And as the method for detecting a signal recorded by this NRZI modulation method, there can be mentioned a partial response detection method. Among them, the PR (1, 0, −1) detection method which is classified as class 4 by E. R. Kretzmer [E. R. Kretzmer, "Generalization of a Technique for Binary Data", IEEE Transactions on Communications Technology, VOL. COM-14(1), pp. 67–68 (February 1966)] is such that, as shown in FIG. 2 showing the frequency-response curve, the peak of the spectrum at the detection point is in the middle frequency domain, and the spectra on the low frequency domain and the high frequency domain decrease, respectively, hence it has an excellent S/N ratio, as well as it has an advantage in that the detection error is hardly caused because the direct-current component is not contained in the detection point.

The PR (1, 0, −1) detection method will be further described with reference to the signal flow in the PR (1, 0, −1) detection method of FIG. 3 and the motion waveform of FIG. 4. In FIG. 3, the input signal a1 (the top line in FIG. 4) is predecoded by a predecoding circuit PD constituting a recording system in which the transfer function is expressed by $1/(1-D^2)$ {D: delay operator} and recorded in a recording medium as a recording signal b1 (FIG. 4). This recording signal b1 is differentiated by a magnetic recording/reproduction system A to become a reproduction signal c1 (FIG. 4) at the time of reproduction.

This magnetic recording/reproduction system A corresponds to the head 1~the reproduction amplifier 3 shown in FIG. 1, and approximately has a transfer function of 1−D. The reproduction decoder B adds a delay signal d1 (FIG. 2) in which the reproduction signal c1 is delayed by 1 bit period T on the reproduction signal c1 to generate an added signal e1 (FIG. 2). This reproduction decoder B is inserted as a part of the detection circuit 11 of FIG. 1, and has a transfer function of 1+D, and the output thereof is regarded as the detection point.

The transfer function of this reproduction system (from the magnetic recording/reproduction system A to the reproduction decoder B) is expressed as $(1-D)\times(1+D)=1-D^2$, and the transfer function of the recording/reproduction system combined with the predecoding circuit PD in the recording system having the transfer function $(1-D^2)^{-1}$ (from the pre-decoding circuit PD to the reproduction decoder B) becomes $(1-D^2)^{-1}\times(1-D^2)=1$, and the input signal a1 appears at the detection point as the added signal e1 (FIG. 4).

Then, the code detection circuit C shown in FIG. 3 (corresponding to the detection circuit 11 shown in FIG. 1) compares the added signal e1 with the threshold $V_H$ on the plus side and the threshold $V_L$ on the minus side to convert the signal into a binary format. That is, when the added signal e1 belongs to the value area not lower than the threshold $V_H$ or not higher than the threshold $V_L$, the added signal e1 is detected as the theoretical value "1", and when the added signal e1 belongs to the value area between the thresholds $V_H$ and $V_L$, the added signal e1 is detected as the theoretical value "0", and a comparator output signal f1 (FIG. 4) is generated.

Referring back to FIG. 1, the detection circuit 11 obtains the comparator output signal f1 with the above-mentioned PR (1, 0, −1) detection method, latches it by using a master clock signal g1 (FIG. 4) being input from the clock generation circuit 9 to generate a digital signal h1 (the bottom line in FIG. 4). Thus obtained digital signal h1 becomes the signal which has reproduced the input signal a1 (the top line in FIG. 4). With regard to the details of the PR (1, 0, −1) detection method including other detection methods such as an integrating detection and the like, there is a detailed description in the "Introduction to the magnetic recording" (written by Katsuya Yokoyama, Sogo Denshi Shuppan, 1988 first edition).

According to the waveform equalizer included in the conventional digital recording/reproduction apparatus, since the equalizing characteristic is fixed in accordance with the initial characteristic of the apparatus, even if the equalizing characteristic is set to the optimum value so that the distortion amount in the phase and in the amplitude of the reproduction signal becomes minimum, if the optimum value itself of the equalizing characteristic changes with the change of the characteristic with the lapse of time due to the change of the magnetic tape or the head, or the wear of the head, it becomes difficult to equalize the waveform properly, and the error rate increases.

That is, since the PR (1, 0, −1) detection method does not contain the direct-current component, as described above, it has an advantage in that the distortion in the waveform is not caused with the rotary transformer which does not transfer the direct-current component. Compared with the integrating detection in which the conversion into the digital form is performed by comparing the size to one threshold, however, since conversion into the digital form is performed from the relation to two thresholds $V_H$ and $V_L$, the noise margin to the threshold decreases.

Therefore, when the equalizing characteristic of the waveform equalizer is fixed, if the characteristic of the reproduction system such as a head changes with the lapse of time, the distortion amount of the added signal e shown in FIG. 4 increases, hence such a problem is caused in the PR (1, 0, −1) detection method having a poor noise margin that a risk of misleading the conversion into a digital form drastically increases.

SUMMARY OF THE INVENTION

In view of the above problems, it is the object of the present invention to provide a waveform equalizer which can equalize the waveform adequately even if the characteristic of the transfer channel of the reproduction signal of a magnetic tape, a head and the like changes with the lapse of time, and a digital recording/reproduction apparatus having the waveform equalizer.

The present invention has the structure described below in order to solve the afore-mentioned problems.

Namely, the waveform equalizer according to the invention as set forth in the aspect 1 is a waveform equalizer which equalizes the waveform of the reproduction signal reproduced from a recording medium, comprising equalizing means for equalizing the waveform of the reproduction signal based on the equalizing coefficient; reference signal-generating means for extracting an isolated wave from the reproduction signal to generate a reference signal based on the isolated wave; and equalizing coefficient control means for carrying out an operation of the equalizing error of the isolated wave of the reproduction signal whose waveform has been equalized by the equalizing means from the reference signal to control the equalizing coefficient based on the equalizing error.

The waveform equalizer according to the invention as set forth in the aspect 2 is a waveform equalizer which equalizes the waveform of the reproduction signal reproduced from a recording medium, comprising isolated wave-extracting means for extracting the isolated wave from the reproduction signal; reference signal-generating means for generating a reference signal based on the isolated wave extracted by the isolated wave-extracting means; selecting means for selecting either of the reproduction signal or the isolated wave extracted by the isolated wave-extracting means, based on the start pulse; equalizing means for equalizing the waveform of the reproduction signal or the isolated wave selected by the selecting means based on the equalizing coefficient; and equalizing coefficient control means for controlling the equalizing coefficient based on the equalizing error of the isolated wave whose waveform has been equalized by the equalizing means from the reference signal.

The digital recording/reproduction apparatus having the waveform equalizer according to the invention as set forth in the aspect 3 comprises signal detecting means for detecting a digital signal from a recording medium to output the signal as a reproduction signal; a waveform equalizer which equalizes the waveform of the reproduction signal; and binary value-forming means for converting the output of the waveform equalizer to a binary format to detect the digital signal, wherein the waveform equalizer comprises equalizing means for equalizing the waveform of the reproduction signal based on the equalizing coefficient; reference signal-generating means for extracting an isolated wave from the reproduction signal to generate a reference signal based on the isolated wave; and equalizing coefficient control means for carrying out an operation of the equalizing error of the isolated wave of the reproduction signal whose waveform has been equalized by the equalizing means from the reference signal to control the equalizing coefficient based on the equalizing error.

The digital recording/reproduction apparatus having the waveform equalizer according to the invention as set forth in the aspect 4 comprises signal detecting means for detecting a digital signal recorded on a recording medium to output the signal as a reproduction signal; compensation means for compensating the phase or amplitude characteristic of the reproduction signal; clock signal-generating means for generating a master clock signal which becomes a time reference of the whole motion based on the reproduction signal compensated by the compensation means; a waveform equalizer which equalizes the waveform of the reproduction signal compensated by the compensation means; and binary value-forming means for converting the output of the waveform equalizer to a binary format to detect the digital signal, wherein the waveform equalizer comprises isolated wave-extracting means for extracting the isolated wave from the reproduction signal; reference signal-generating means for generating a reference signal based on the isolated wave extracted by the isolated wave-extracting means; selecting means for selecting either of the reproduction signal or the isolated wave extracted by the isolated wave-extracting means, based on the start pulse; equalizing means for equalizing the waveform of the reproduction signal or the isolated wave selected by the selecting means based on the equalizing coefficient; and equalizing coefficient control means for controlling the equalizing coefficient based on the equalizing error of the isolated wave whose waveform has been equalized by the equalizing means from the reference signal.

The digital recording/reproduction apparatus having the waveform equalizer according to the invention as set forth in the aspect 5 comprises signal detecting means for detecting a digital signal recorded on a recording medium to output the signal as a first reproduction signal; conversion means for quantizing the waveform of the first reproduction signal to convert the signal to a second reproduction signal; a waveform equalizer for equalizing the waveform of the second reproduction signal; and binary value-forming means for converting the output of the waveform equalizer to a binary format to detect the digital signal, wherein the waveform equalizer comprises equalizing means for equalizing the waveform of the second reproduction signal based on the equalizing coefficient; reference signal-generating means for extracting an isolated wave from the second reproduction signal to generate a reference signal based on the isolated wave; and equalizing coefficient control means for carrying out an operation of the equalizing error of the isolated wave of the second reproduction signal whose waveform has been equalized by the equalizing means from the reference signal to control the equalizing coefficient based on the equalizing error.

The digital recording/reproduction apparatus having the waveform equalizer according to the invention as set forth in the aspect 6 comprises signal detecting means for detecting a digital signal recorded on a recording medium to output the signal as a first reproduction signal; compensation means for compensating the phase or amplitude characteristic of the first reproduction signal; conversion means for quantizing the waveform of the first reproduction signal compensated by the compensation means to convert the waveform to a second reproduction signal; clock signal-generating means for generating a master clock signal which becomes a time reference of the whole motion based on the first reproduction signal compensated by the compensation means; a waveform equalizer which equalizes the waveform of the second reproduction signal; and binary value-forming means for converting the output of the waveform equalizer to a binary format to detect the digital signal, wherein the waveform equalizer comprises isolated wave-extracting means for extracting the isolated wave from the second reproduction signal; reference signal-generating means for generating a reference signal based on the isolated wave extracted by the isolated wave-extracting means; selecting means for selecting either of the second reproduction signal obtained by converting the waveform with the conversion means or the isolated wave extracted by the isolated wave-extracting means, based on the start pulse; equalizing means for equalizing the waveform of the second reproduction signal or the isolated wave selected by the selecting means based on the equalizing coefficient; and equalizing coefficient control means for controlling the equalizing coefficient based on the equalizing error of the isolated wave whose waveform has been equalized by the equalizing means from the reference signal.

The digital recording/reproduction apparatus having the waveform equalizer according to the invention as set forth in the aspect 7 has a structure of a digital recording/reproduction apparatus having the waveform equalizer according to the aspect 5, wherein the conversion means samples the first reproduction signal using a plurality of sampling signals having different phases to convert the waveform thereof to a plurality of second reproduction signals, and the reference signal-generating means extracts respective isolated waves of the plurality of second reproduction signals to generate a reference signal from the isolated wave having the largest peak level among the isolated waves.

The digital recording/reproduction apparatus having the waveform equalizer according to the invention as set forth in the aspect 8 has a structure of a digital recording/reproduction apparatus having the waveform equalizer according to the aspect 6, wherein the conversion means samples the first reproduction signal using a plurality of sampling signals having different phases to convert the waveform thereof to a plurality of second reproduction signals, the isolated wave-extracting means extracts respective isolated waves of the plurality of second reproduction signals and the reference signal-generating means generates a reference signal from the isolated wave having the largest peak level among the isolated waves extracted by the isolated wave-extracting means.

The waveform equalizer according to the invention as set forth in the aspect 9 and 10 has a structure of the waveform equalizer according to the aspect 1 or 2, wherein the equalizing coefficient control means controls the equalizing coefficient so that the equalizing error becomes minimum.

The waveform equalizer according to the invention as set forth in the aspect 11 and 12 has a structure of the waveform equalizer according to the aspect 1 or 2, wherein the equalizing coefficient control means determines a plurality of equalizing errors by changing stepwisely the equalizing coefficient within a predetermined range, when it controls the equalizing coefficient of the equalizing means, and designates the equalizing coefficient in which the equalizing error is the smallest among the plurality of equalizing errors as the equalizing coefficient of the equalizing means.

The waveform equalizer according to the invention as set forth in the aspect 13 and 14 has a structure of the waveform equalizer according to the aspect 1 or 2, wherein a value that the equalizing error cannot become the smallest is set as the initial value of the equalizing coefficient, a plurality of equalizing errors are determined by changing stepwisely the equalizing coefficient within a predetermined range including the initial value, and the equalizing coefficient in which the equalizing error is the smallest among the plurality of equalizing errors is designated as the equalizing coefficient of the equalizing means.

The waveform equalizer according to the invention as set forth in the aspect 15 and 16 has a structure of the waveform equalizer according to the aspect 1 or 2, wherein the equalizing coefficient control means changes the equalizing coefficient stepwisely from the initial value, when it controls the equalizing coefficient of the equalizing means, searches an equalizing coefficient in which the equalizing error is the smallest based on the changed portion of the equalizing error due to the stepwise change of the equalizing coefficient, to control the equalizing coefficient of the equalizing means.

The waveform equalizer according to the invention as set forth in the aspect 17 has a structure of the waveform equalizer according to the aspect 2, wherein the isolated wave-extracting means has a plurality of registers for temporarily stores a plurality of isolated waves extracted from the reproduction signal and outputs the mean value of the isolated wave levels stored in the plurality of registers as the level of the isolated wave extracted from the reproduction signal.

The waveform equalizer according to the invention as set forth in the aspect 18 has a structure of the waveform equalizer according to the aspect 2, wherein the isolated wave-extracting means has a plurality of registers for temporarily stores a plurality of isolated waves extracted from the reproduction signal and outputs the isolated wave having the largest peak level among the isolated waves stored in the plurality of registers, as the isolated wave extracted from the reproduction signal.

The waveform equalizer according to the invention as set forth in the aspects 19 and 20 has a structure of the waveform equalizer according to the aspect 17 or 18, wherein the isolated wave-extracting means extracts the isolated waves having a peak level not smaller than the predetermined value and stores the isolated waves in the register.

The digital recording/reproduction apparatus having the waveform equalizer according to the invention as set forth in the aspects 21 and 22 has a structure of a digital recording/reproduction apparatus having the waveform equalizer according to the aspect 5 or 6, wherein the equalizing means is composed of a digital transversal filter.

The digital recording/reproduction apparatus having the waveform equalizer according to the invention as set forth in the aspects 23 and 24 has a structure of a digital recording/reproduction apparatus having the waveform equalizer according to the aspect 5 or 6, wherein the equalizing coefficient control means sets the maximum value which the register storing the equalizing error can take as the initial value of the equalizing error obtained by carrying out an operation.

The waveform equalizer according to the present invention having the above-mentioned structures and the digital recording/reproduction apparatus operate as described below.

In accordance with the waveform equalizer of the invention as set forth in the aspect 1, the equalizing means equalizes the waveform of the reproduction signal with an equalizing characteristic determined based on the equalizing coefficient. At this time, the equalizing coefficient is controlled and set as described below. That is, the reference signal-generating means first extracts an isolated wave from the reproduction signal and generates a reference signal. The isolated wave which becomes the base of the reference signal is in a signal area of the second reproduction signal having no waveform distortion due to the interference between the waveforms, and the reference signal is a hypothetical waveform signal which would be obtained if the waveform of the isolated wave were ideally (optimumly) equalized. On the other hand, the equalizing coefficient control means compares the waveform signal obtained by equalizing the waveform of the isolated wave extracted from the reproduction signal by the equalizing means with the reference signal to calculate the equalizing error, and controls the equalizing coefficient of the equalizing means so that the equalizing error becomes the smallest. As a result, the equalizing error is set for the isolated wave of the reproduction signal so that the equalizing error becomes minimum, thus the equalizing characteristic of the equalizing means is determined.

In accordance with the waveform equalizer of the invention as set forth in the aspect 2, the equalizing means equalizes the waveform of the input reproduction signal based on the equalizing coefficient. At this time, the equalizing coefficient is controlled as follows. Namely, the isolated wave-extracting means first extracts the isolated wave from the reproduction signal, and the reference signal-generating means generates a reference signal from the isolated wave. Then, the selecting means selects the isolated wave among the reproduction signal or the extracted isolated wave, based on the start pulse being output for a predetermined time when the recording medium is loaded on the apparatus, and supplies it to the equalizing means. The equalizing means equalizes the waveform of the isolated wave selected by the selecting means. On the other hand, equalizing coefficient control means compares the reference signal and the waveform signal obtained by equalizing the waveform of the isolated wave extracted from the reproduction signal by the equalizing means to carry out an operation of the equalizing error, and controls the equalizing coefficient of the equalizing means so that this equalizing error becomes minimum. As a result, the equalizing error is set for the isolated wave of the reproduction signal so that the equalizing error becomes minimum, hence the equalizing characteristic of the equalizing means is determined.

Furthermore, in accordance with the digital recording/reproduction apparatus having the waveform equalizer of the invention as set forth in the aspect 3, when the signal detecting means detects the digital signal recorded on a recording medium and provides the digital signal as the reproduction signal to the waveform equalizer, the waveform equalizer works similarly as the waveform equalizer as set forth in the aspect 1 to equalize the waveform of the reproduction signal and gives the reproduction signal to the binary value-forming means. The binary value-forming means converts the output of the waveform equalizer to a binary format to detect and reproduce the digital signal.

Furthermore, in accordance with the digital recording/reproduction apparatus having the waveform equalizer of the invention as set forth in the aspect 4, when the signal detecting means detects the digital signal recorded on a recording medium and outputs it as the reproduction signal to the compensation means, the compensation means compensates the phase and amplitude characteristics of the reproduction signal. Here, the amount compensated by the compensation means is fixed. The clock signal-generating means generates a master clock signal which becomes a time reference of the whole motion based on the reproduction signal compensated by the compensation means, and provides the master clock signal to the equalizing means and the binary value-forming means on the post stage to synchronize these motions. The waveform equalizer works similarly as the waveform equalizer as set forth in the aspect 2 to equalize the waveform of the reproduction signal compensated by the compensation means and provides the waveform-equalized reproduction signal to the binary value-forming means. The binary value-forming means converts the output of the waveform equalizer to a binary format to detect and reproduce the digital signal.

Furthermore, in accordance with the digital recording/reproduction apparatus having the waveform equalizer of the invention as set forth in the aspect 5, when the signal detecting means detects the digital signal recorded on a recording medium and provides it as the first reproduction signal to the conversion means, the conversion means quantizes the waveform of the first reproduction signal to convert the signal to the second reproduction signal. The waveform equalizer works similarly as the waveform equalizer as set forth in the aspect 1 to equalize the waveform of the second reproduction signal. The binary value-forming means converts the output of the waveform equalizer to binary form to detect and reproduce the digital signal.

Furthermore, in accordance with the digital recording/reproduction apparatus having the waveform equalizer of the invention as set forth in the aspect 6, the signal detecting means detects the digital signal recorded on a recording medium and outputs the signal as the first reproduction signal. When the compensation means compensates the phase and amplitude characteristics of the reproduction signal and provides the compensated signal to the conversion means, the conversion means quantizes the waveform of the signal to convert the signal to the second reproduction signal. On the other hand, the signal-generating means generates a master clock signal which becomes a time reference of the whole motion based on the first reproduction signal compensated by the compensation means, and provides the master clock signal to the conversion means, the equalizing means and the binary value-forming means to synchronize these motions. The waveform equalizer works similarly as the waveform equalizer as set forth in the aspect 2 to equalize the waveform of the second reproduction signal compensated by the compensation means and provides the waveform-equalized reproduction signal to the binary value-forming means. The binary value-forming means converts the output of the waveform equalizer to a binary format to detect and reproduce the digital signal.

Furthermore, in accordance with the digital recording/reproduction apparatus having the waveform equalizer of the invention as set forth in the aspect 7, in the digital recording/reproduction apparatus having the waveform equalizer as set forth in the aspect 5, the conversion means samples the first reproduction signal by staggering the time, using a plurality of sampling signals having different phases, thereby converts the waveform to a plurality of second reproduction signals. Then, the reference signal-generating means extracts isolated waves from the plurality of second reproduction signals, respectively, to generate the reference signal from the one having the largest peak level among the isolated waves.

Furthermore, in accordance with the digital recording/reproduction apparatus having the waveform equalizer of the invention as set forth in the aspect 8, in the digital recording/reproduction apparatus having the waveform equalizer as set forth in the aspect 6, the conversion means samples the first reproduction signal by staggering the time, using a plurality of sampling signals having different phases, thereby converts the waveform to a plurality of second reproduction signals. Then, the isolated wave-extracting means extracts isolated waves from the plurality of second reproduction signals, respectively. And the reference signal-generating means generates the reference signal from the one having the largest peak level among the isolated waves extracted by the isolated wave-extracting means.

In accordance with the waveform equalizer of the invention as set forth in the aspects 9 and 10, in the waveform equalizer as set forth in the aspect 1 or 2, the equalizing coefficient control means controls the equalizing coefficient so that the equalizing error becomes minimum.

In accordance with the waveform equalizer of the invention as set forth in the aspect 11 and 12, in the waveform equalizer as set forth in the aspect 1 or 2, the equalizing coefficient control means determines a plurality of equalizing errors by changing stepwisely the equalizing coefficient within a predetermined range, when it controls the equalizing coefficient of the equalizing means, and sets the equalizing coefficient in which the equalizing error is the smallest among the plurality of equalizing errors as the equalizing coefficient of the equalizing means.

In accordance with the waveform equalizer of the invention as set forth in the aspect 13 and 14, in the waveform equalizer as set forth the aspect 1 or 2, a value that the equalizing error cannot become the smallest is set as the initial value of the equalizing coefficient, a plurality of equalizing errors are determined by changing stepwisely the equalizing coefficient within a predetermined range including the initial value, and the equalizing coefficient in which the equalizing error is the smallest among the plurality of equalizing errors is designated as the equalizing coefficient of the equalizing means.

In accordance with the waveform equalizer of the invention as set forth in the aspect 15 and 16, in the waveform equalizer as set forth in the aspect 1 or 2, the equalizing coefficient control means changes the equalizing coefficient stepwisely from the initial value, when it controls the equalizing coefficient of the equalizing means, and searches an equalizing coefficient in which the equalizing error is the smallest, based on the changed portion of the equalizing error due to the stepwise change of the equalizing coefficient, to control the equalizing coefficient of the equalizing means.

In accordance with the waveform equalizer of the invention as set forth in the aspect 17, in the waveform equalizer as set forth in the aspect 2, the isolated wave-extracting means has a plurality of registers for temporarily storing a plurality of isolated waves extracted from the reproduction signal and outputs the mean value of peak levels of the isolated waves stored in the plurality of registers as the peak level of the isolated wave extracted from the reproduction signal.

In accordance with the waveform equalizer of the invention as set forth in the aspect 18, in the waveform equalizer according to the aspect 2, the isolated wave-extracting means has a plurality of registers for temporarily storing plurality of isolated waves extracted from the reproduction signal and outputs the isolated wave having the largest peak level among the isolated waves stored in the plurality of registers, as the isolated wave extracted from the reproduction signal.

In accordance with the waveform equalizer of the invention as set forth in the aspects 19 and 20, in the waveform equalizer according to the aspect 17 or 18, the isolated wave-extracting means extracts the isolated waves having a peak level not smaller than the predetermined value and stores the isolated waves in the register.

In accordance with the digital recording/reproduction apparatus having the waveform equalizer of the invention as set forth in the aspects 21 and 22, in the waveform equalizer according to the aspect 5 or 6, a digital transversal filter constituting the equalizing means equalizes the waveform of the second reproduction signal, designating the equalizing coefficient as a tap coefficient.

In accordance with the digital recording/reproduction apparatus having the waveform equalizer of the invention as set forth in the aspects 23 and 24, in the digital recording/reproduction apparatus having the waveform equalizer according to the aspect 5 or 6, the equalizing coefficient control means sets the maximum value which the register storing the equalizing error can take, as the initial value of the equalizing error obtained by carrying out an operation with respect to the equalizing means. Therefore, the initial value of the equalizing error becomes the maximum value that can be set to the register.

DESCRIPTION OF THE PREFERRED EMBODIMENT

Figure 1:
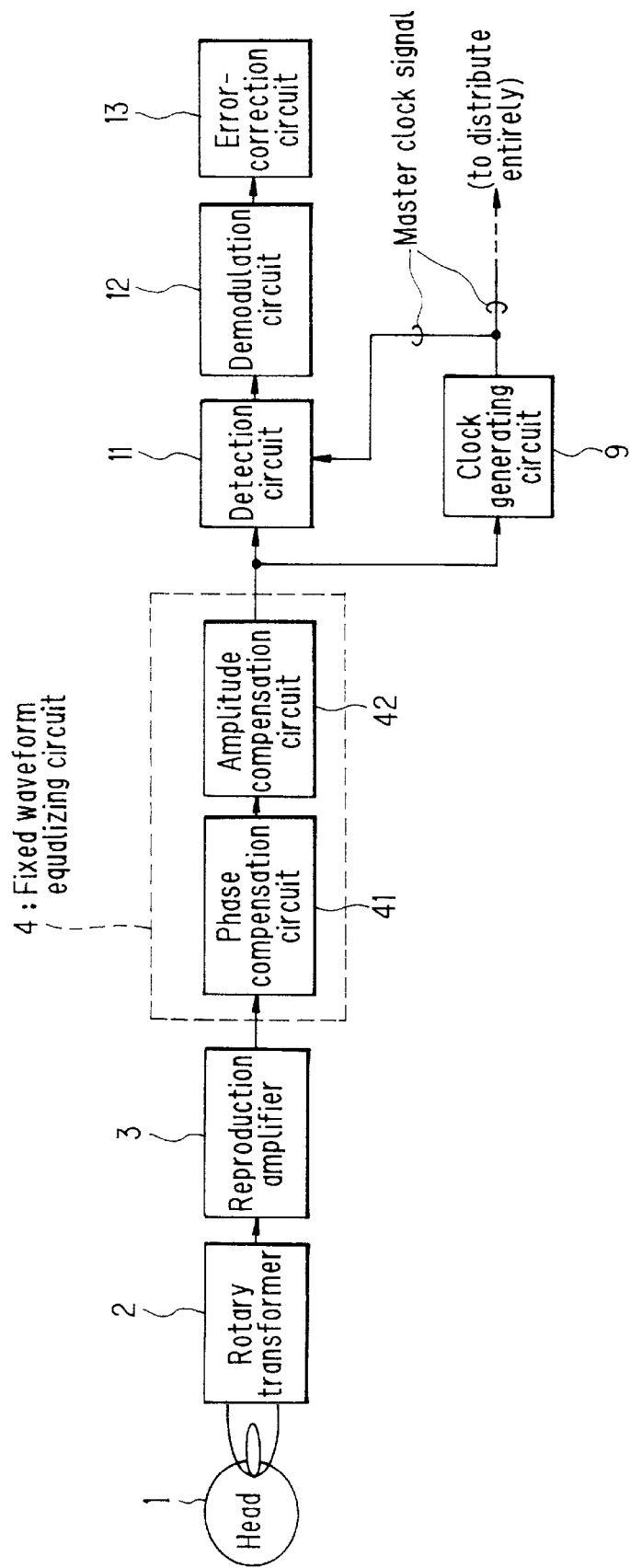
FIG. 1 is a block diagram of a digital recording/reproduction apparatus having the conventional waveform equalizer.
Figure 2:
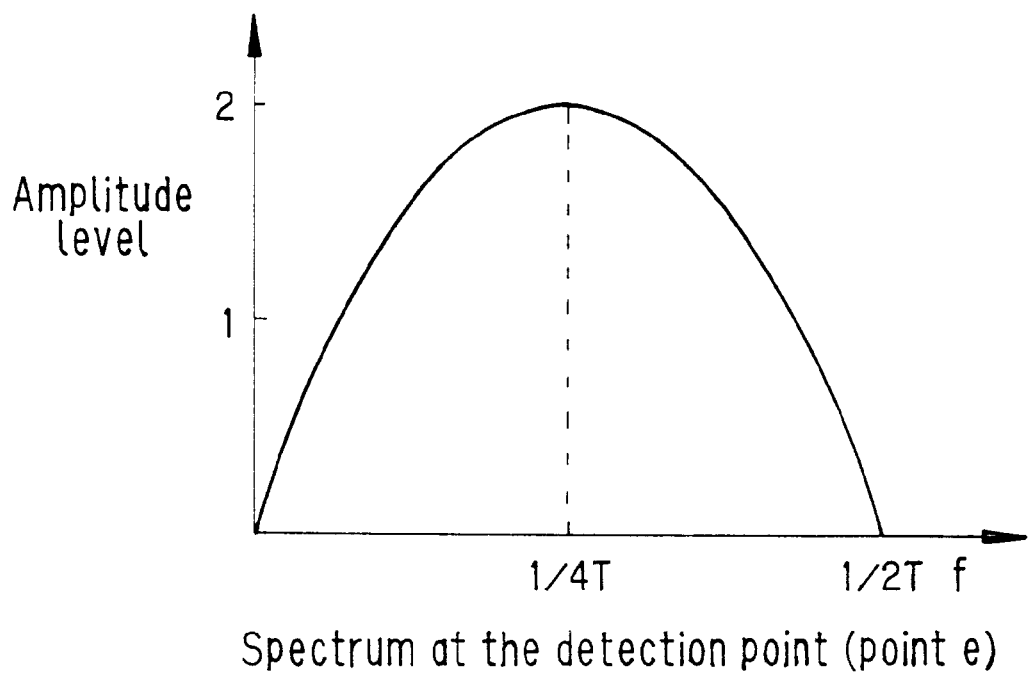
FIG. 2 is a frequency-response curve of a partial response detection method.
Figure 3:
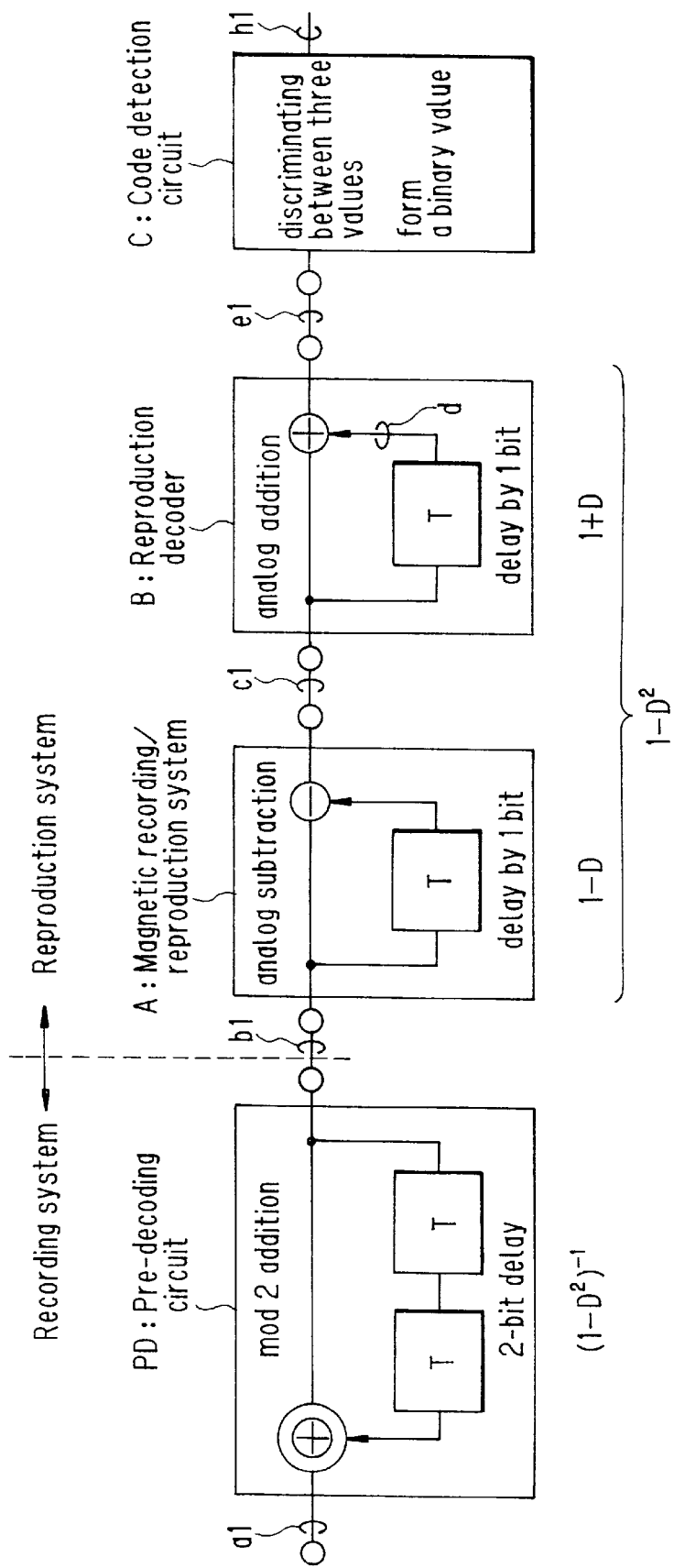
FIG. 3 is a diagram illustrating the partial response detection method.
Figure 4:
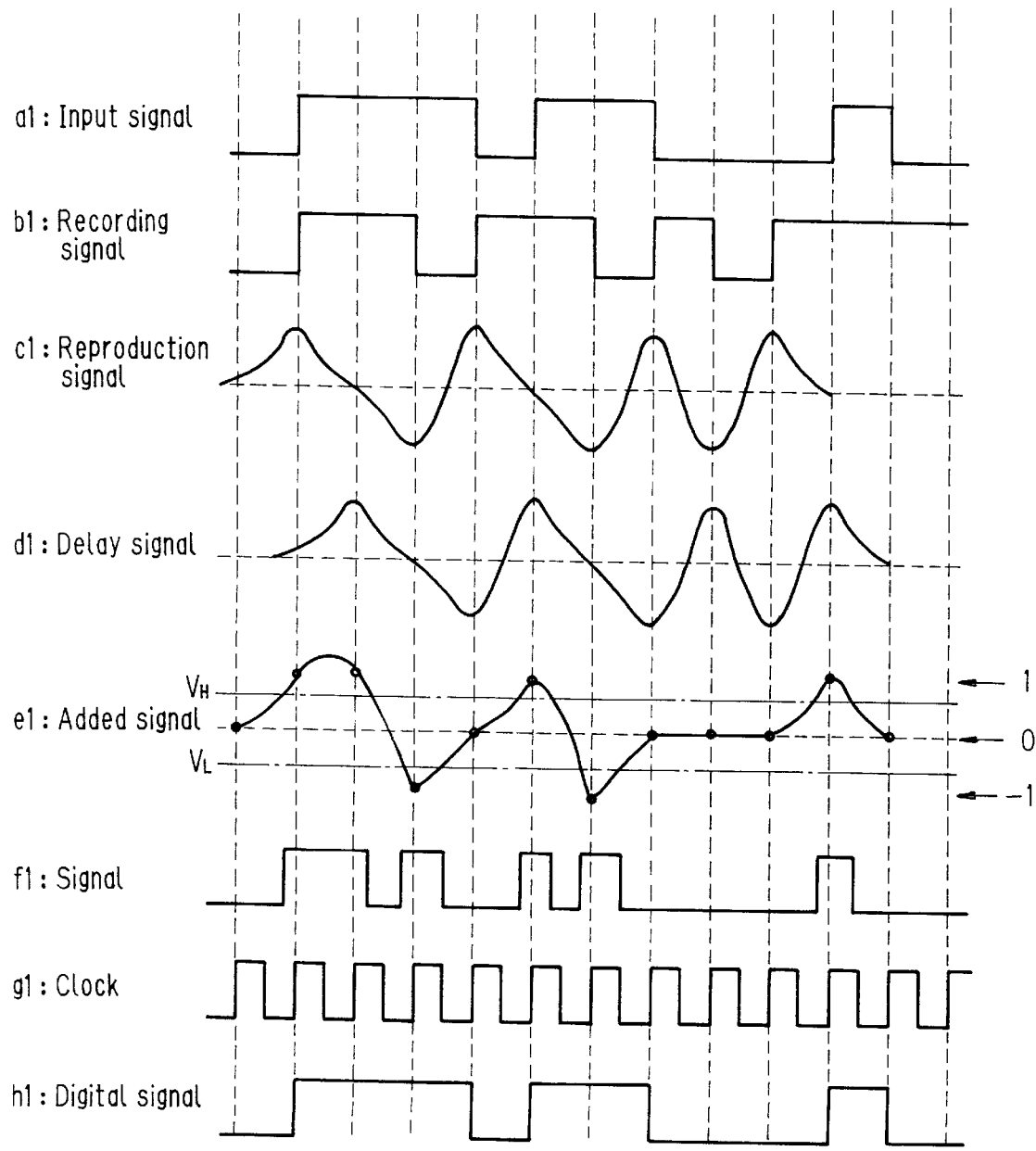
FIG. 4 is a diagram illustrating the motion of the digital recording/reproduction apparatus having the conventional waveform equalizer.

Hereinafter, the waveform equalizer according to the embodiment of the present invention and the digital recording/reproduction apparatus having the same will be described with reference to FIGS. 5 to 10. In each figure, the same reference numeral is given to the same component or the corresponding component and their description will be omitted.

Figure 5:
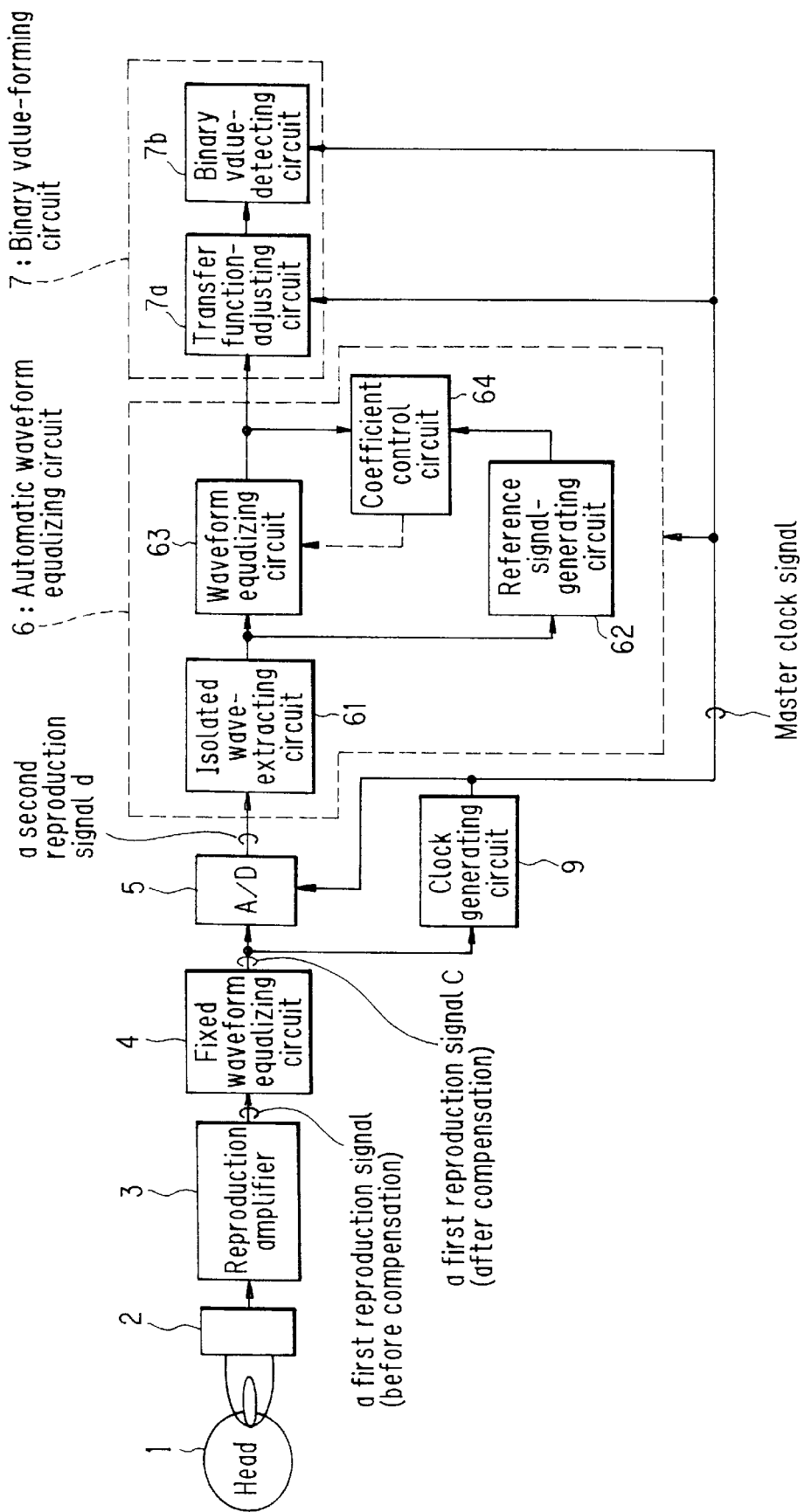
FIG. 5 is a block diagram of the digital recording/reproduction apparatus having the waveform equalizer according to the embodiments of the present invention.

As shown in FIG. 5, the digital recording/reproduction apparatus having the waveform equalizer of the present embodiment has, as the configurations common to the conventional apparatus shown in FIG. 1, a head 1~a reproduction amplifier 3 (signal detecting means) for detecting the digital signal recorded on a recording medium and outputting the first reproduction signal (before compensation), and a fixed waveform-equalizing circuit 4 (compensation means) for compensating the phase and the amplitude of the first reproduction signal, on the pre-stage side. In addition, on the post-stage side, it comprises, as the peculiar configuration in the apparatus of this embodiment, an A/D converter (conversion means) for sampling the waveform of the first reproduction signal compensated by the fixed waveform-equalizing circuit 4 to convert it to the waveform of the second reproduction signal, a clock generating circuit 9 (clock signal-generating means) for generating a master clock signal which becomes a time reference of the whole motion of the apparatus for the synchronization, based on the first reproduction signal compensated by the fixed waveform-equalizing circuit 4, an automatic waveform equalizing circuit 6 (waveform equalizer) for equalizing the waveform of the second reproduction signal, and a binary value-forming circuit 7 (binary value-forming means) for converting the output of the automatic waveform equalizing circuit 6 to a binary format to detect the digital signal.

Figure 6:
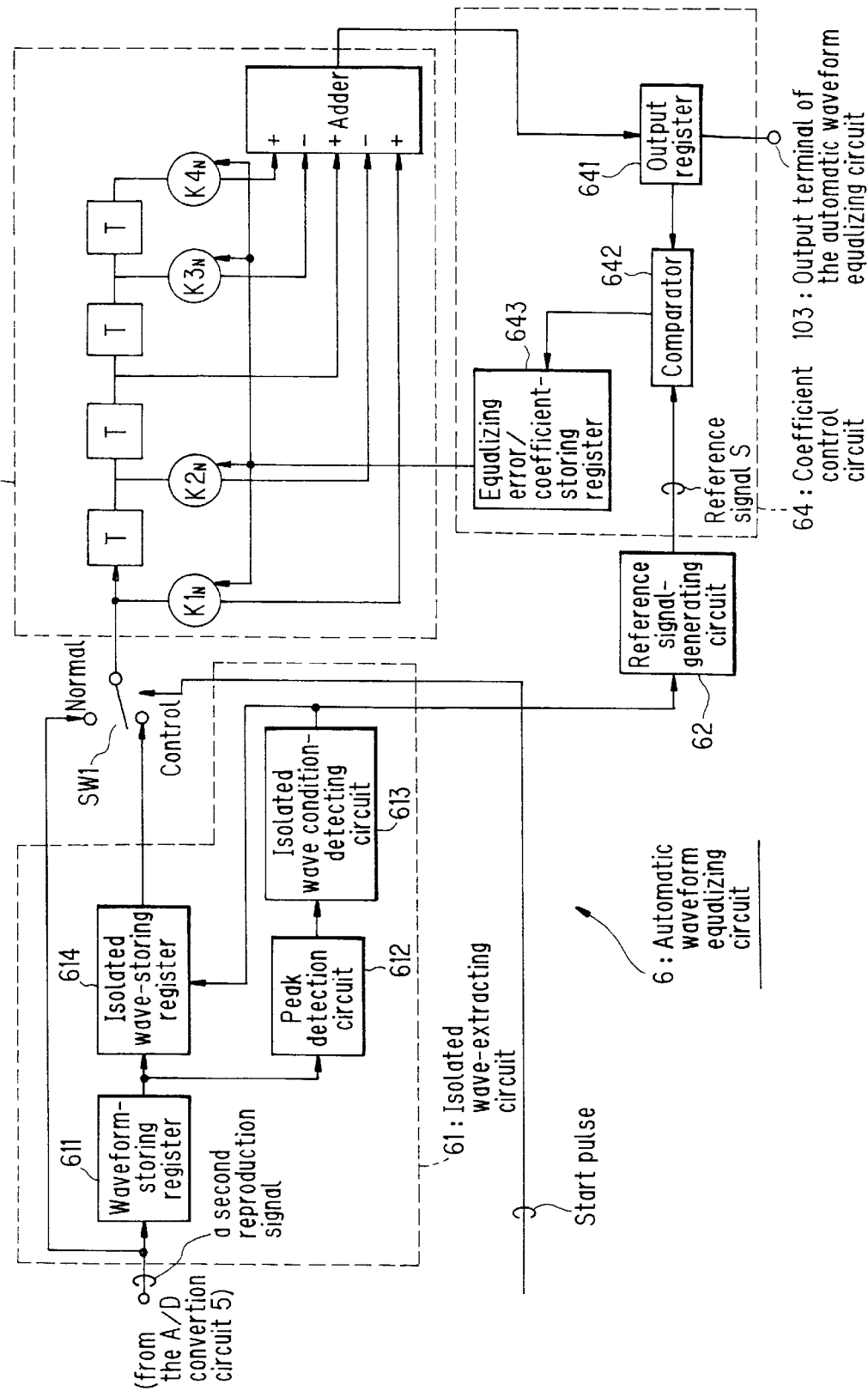
FIG. 6 is a block diagram of the waveform equalizer according to the embodiments of the present invention.

Furthermore, the automatic waveform equalizing circuit 6 comprises, as shown in the detailed structure of FIG. 6, an isolated wave-extracting circuit 61 (isolated wave-extracting means) for extracting the isolated wave of the second reproduction signal being input from the A/D conversion circuit 5 shown in FIG. 5, a reference signal-generating circuit 62 (reference signal-generating means) for generating a reference signal based on the isolated wave extracted by the isolated wave-extracting circuit 61, a switch SW1 (selecting means) for selecting either of the second reproduction signal being input from the A/D conversion circuit 5 or the isolated wave extracted by the isolated wave-extracting means, based on the start pulse, a waveform equalizing circuit 63 comprising a transversal digital filter or the like which equalizes the waveform of the second reproduction signal or the isolated wave selected by the switch SW1 based on the equalizing coefficient, and a coefficient controlling circuit 64 (equalizing coefficient control means) for controlling the equalizing coefficient based on the equalizing error of the isolated wave whose waveform has been equalized by the waveform equalizing circuit 63 from the reference signal S.

Here, the isolated wave-extracting circuit 61 comprises a waveform-storing register 611 for temporarily storing the second reproduction signal being input from the A/D conversion circuit 5 on the pre-stage, a peak detection circuit 612 for detecting the peak of the second reproduction signal, an isolated wave condition-detecting circuit 613 for detecting the time position of the peak which satisfies the condition of the isolated wave described later among the detected peaks, and an isolated wave-storing register 614 for inputting the signal area of the corresponding second reproduction signal from the waveform-storing register 611 based on the detection result of the isolated wave condition-detecting circuit 613 as the isolated wave and storing the isolated wave.

Moreover, the waveform equalizing circuit 63 comprises a plurality of delay sections for providing time delay of a bit cycle T to the signal being input from the switch SW1 and transmitting the time delay via a tap to the post stage while delaying the signal in turn, and a plurality of multipliers and adders which carry out the weighted operation by multiplying the equalizing coefficients (tap coefficients) $K1_N$, $K2_N$, $K3_N$, $K4_N$ (provided that the coefficient of the center tap is designated as 1, and the description of the coefficient of this tap is omitted) to the signal appearing on each tap, respectively, hence the waveform of the input signal is equalized based on the equalizing coefficients $K1_N$~$K4_N$.

Furthermore, the coefficient control circuit 64 comprises an output register 614 for temporarily storing the output of the waveform equalizing circuit 63, a comparator 642 for comparing the contents of the output register 641 and the reference signal S being output by the reference signal-generating circuit 62 to carry out an operation of the equalizing error, and an equalizing error/coefficient-storing register 643 for storing the equalizing error and the equalizing coefficient.

Referring back to FIG. 5, a binary value-forming circuit 7 is connected to the post stage of the automatic waveform equalizing circuit 6 configured as above-described. This binary value-forming circuit 7 is composed of a transfer function-adjusting circuit 7a for adjusting the transfer function of the whole system to "1", and a binary value-detecting circuit 7b for detecting the binary value by the PR (1, 0, −1) detection method to reproduce the digital signal.

Figure 8:
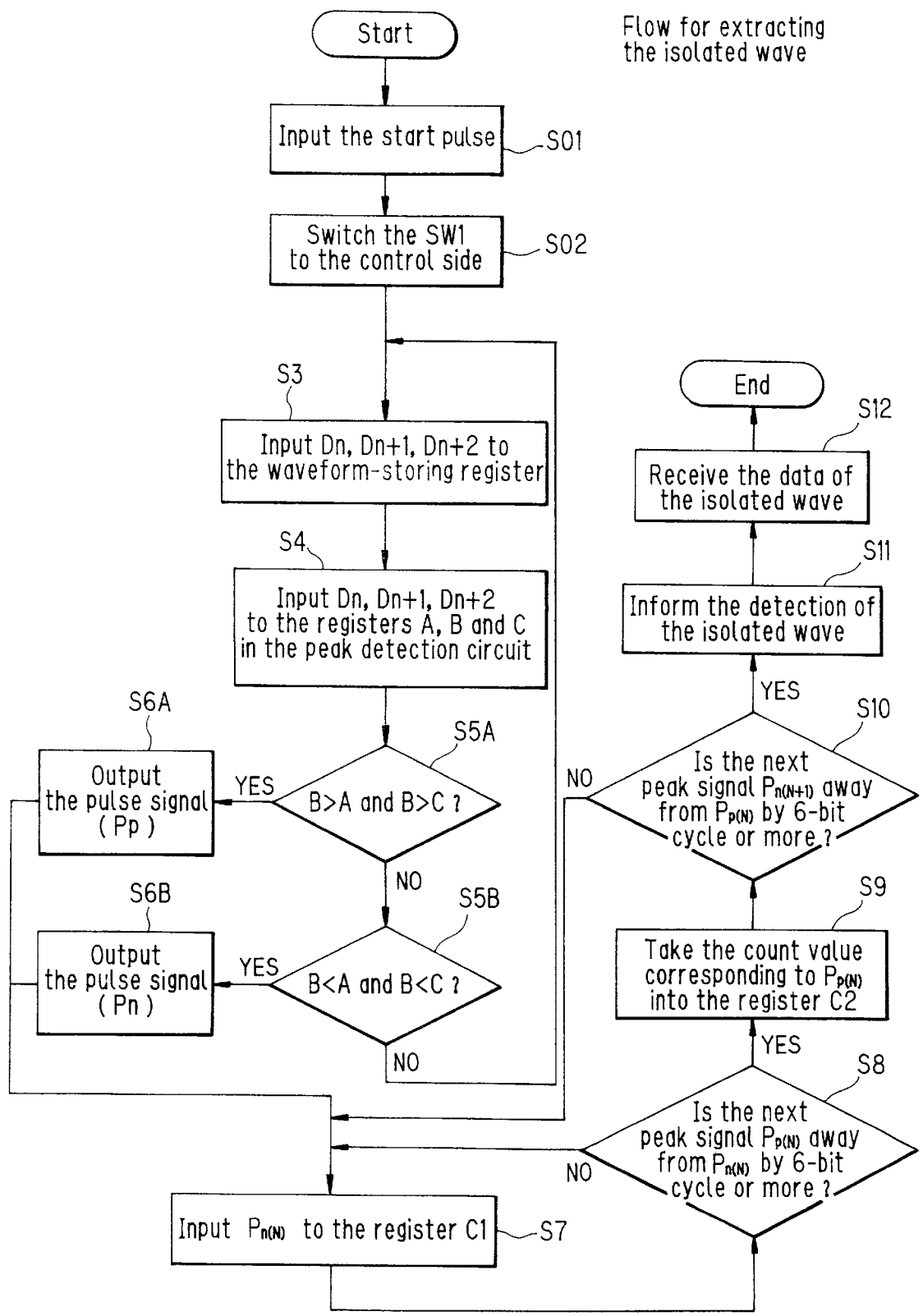
FIG. 8 is a flow chart for explaining the flow for extracting the isolated wave in the waveform equalizer according to the embodiments of the present invention.
Figure 9:
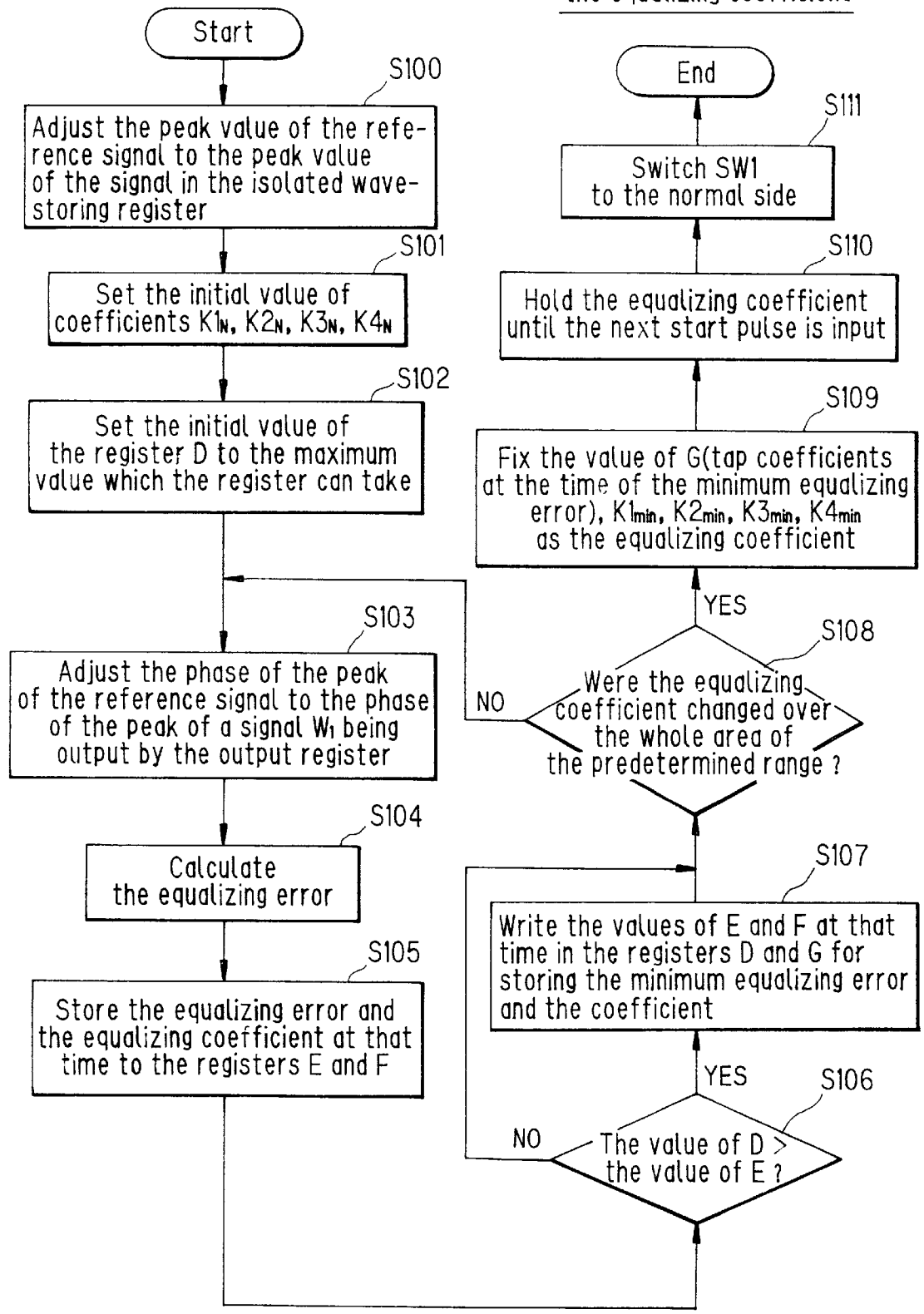
FIG. 9 is a flow chart for explaining the flow for controlling the equalizing coefficient in the waveform equalizer according to the embodiments of the present invention.

Next, the motions of thus formed waveform equalizer of this embodiment (FIG. 6) and the digital recording/reproduction apparatus including the equalizer (FIG. 5) will be described with reference to the waveform diagram shown in FIG. 7, along the flow chart shown in FIGS. 8 and 9.

Figure 7:
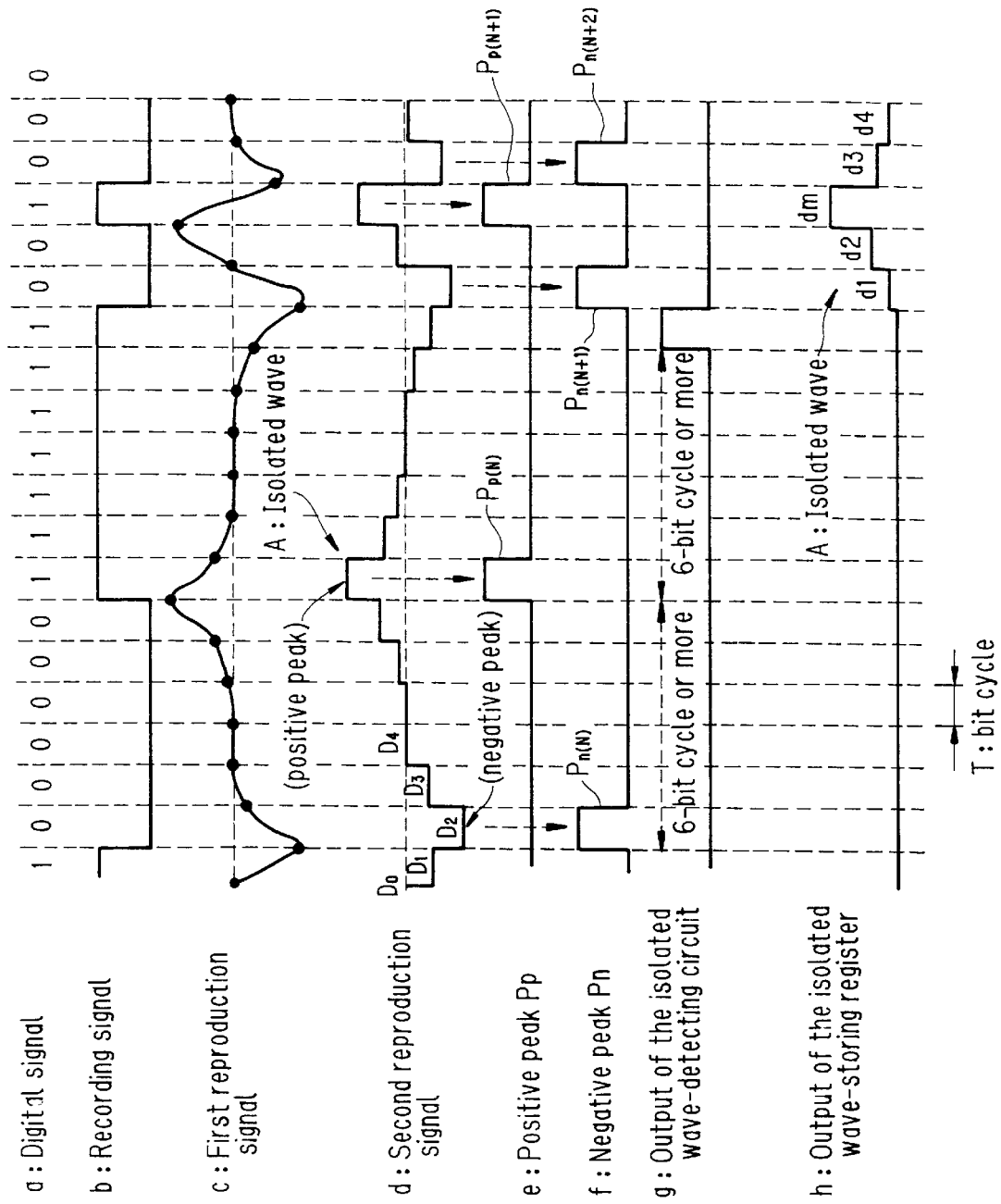
FIG. 7 is a waveform diagram for explaining the motion of the waveform equalizer according to the embodiments of the present invention and the digital recording/reproduction apparatus having the same.

Here, it is assumed that a digital signal a shown in FIG. 7 (the top line) is recorded on a recording medium (not shown) in a form of a recording signal b. In this case, the recording signal b is detected and amplified by the head 1~the reproduction amplifier 3 shown in FIG. 5. Thereafter, the phase and amplitude characteristics are compensated by the fixed waveform-equalizing circuit 4 and the waveform thereof is converted to the waveform of the first reproduction signal c, thereby the motion of the clock generating circuit 9 shown in FIG. 5 is stabilized.

The clock generating circuit 9 generates a master clock signal (the waveform thereof is not shown) from the compensated first reproduction signal c. The A/D converter 5, the automatic waveform equalizing circuit 6, the transfer function-adjusting circuit 7a and the binary value-detecting circuit 7b, to which the master clock signal is input, synchronously operate, designating the bit cycle T determined by the master clock signal as the time reference.

Then, as shown in FIG. 7, the A/D converter 5 samples the first reproduction signal c in an analog amount compensated by the fixed waveform-equalizing circuit 4 in, for example, 8-bit data $D_0$, $D_1$, ..., designating the bit cycle T as the sampling cycle, to generate the second reproduction signal d. That is, the second reproduction signal d is expressed by converting the level at a sampling point of the first reproduction signal c to a digital data having the 256 gradation.

Next, the motion of the automatic waveform equalizing circuit 6 shown in FIG. 5 and FIG. 6 will be described in detail along the flow chart shown in FIG. 8 and FIG. 9.

The motion of the isolated wave-extracting circuit 61 shown in FIG. 6 which constitutes the automatic waveform-equalizing circuit 6 shown in FIG. 5 will now be described first along the flow chart shown in FIG. 8. For example, when a magnetic tape is loaded on the apparatus, the automatic waveform equalizing circuit 6 shown in FIG. 6 inputs the loading pulse and the like which informs the completion of the loading of this magnetic tape as the start pulse from the apparatus (Step S1), and starts the sequential motion for controlling the equalizing coefficient for the waveform equalization.

First, when the loading of the tape is completed, and the reproduction motion is started, the switch SW1 shown in FIG. 6 selects the output of the isolated wave-extracting circuit 61 and outputs it to the waveform equalizing circuit 63 on the post stage (Step S2). This isolated wave-extracting circuit 61 extracts the isolated wave from the second reproduction signal as described below. Here, the isolated wave is defined as a signal area having no waveform distortion due to the interference between the waveforms.

That is, the waveform-storing register 611 which constitutes the input stage of the isolated wave-extracting circuit 61 shifts the data $D_0$, $D_1$, $D_2$, ... in turn for the continuous predetermined bit cycles of the second reproduction signal to store them temporarily (Step S3), and shifts the data $D_n$, $D_{+1}$, $D_{n+2}$, ... in turn for the continuous 3 bit cycles with respect to the respective registers RA, RB and RC built in the peak detection circuit 612 to take them in (Step S4).

The peak detection circuit 612 compares the data stored in each register RA, RB and RC (Step S5A, S5B), and when the data stored in the register RB located in the center in the time series is larger than any other data stored in the other registers RA and RC (Step S5A; YES), outputs a pulse signal $P_p$ (FIG. 7) which indicates that a peak in the positive direction is detected (Step S6A), and when the data is smaller than any other data stored in the other registers RA and RC, outputs a pulse signal $P_n$ (FIG. 7) indicating that a peak in the negative direction is detected (Step S6B). When no peak is detected (Step S5A; NO, and Step S5B; NO), the peak detection circuit 612 returns to Step S3, and performs the similar detection with respect to the next data string.

The isolated wave condition-detecting circuit 613 includes a counter which synchronously counts up to the bit cycle T when the waveform-storing register 611 inputs the second reproduction signal, and this counter measures the time interval of the pulse signal being output by the peak detection circuit 612 to detect if the condition of the isolated wave is satisfied or not. Here, the condition of the isolated wave can be re-defined as a signal having no signal inducing the interference between the waveforms in front and back thereof, since a signal having no interference between the waveforms is designated as the isolated wave, as described above. In this embodiment, as shown in FIG. 7, when the time interval between the front and back pulse signals is 6-bit cycles or more, it is regarded as the isolated wave.

For example, when a pulse signal $P_{n(N)}$ is detected with respect to the negative peak shown in FIG. 7. the isolated wave condition-detecting-circuit 613 takes the count value indicating the time position of this negative peak into the register C1 (not shown) (Step S7). When a pulse signal $P_{p(N)}$ is detected separated from the pulse signal $P_{n(N)}$ by a time interval of 6-bit cycles or more (Step S8; YES), the count value indicating the time position of the positive peak corresponding to this pulse signal $P_{p(N)}$ is taken into the register C2 (not shown)(Step S9), and the time interval till the posterior peak $P_{n(N+1)}$ is measured.

Here, if the time interval till the posterior peak $P_{n(N+1)}$ is 6-bit cycles or more (Step S10; YES), the isolated wave condition-detecting circuit 613 regards the signal area of the second reproduction signal corresponding to the count value stored in the register C2 as the isolated wave, and informs it to the isolated wave-storing register 614 (Step S11). As described above, the time interval of the pulse signal being output by the peak detection circuit 612 is repeatedly measured, and the signal area of the second reproduction signal in which the condition to be satisfied as the isolated wave is satisfied is specified and informed.

The isolated wave-storing register 614 receives the information from the isolated wave condition-detecting circuit 613, as shown in FIG. 7 (the waveform of the lowest line), and receives data $d_m$ corresponding to the count value stored in the register C2 and the data $d_1$~$d_4$ for the front and back 2 bits of this data $d_m$ from the waveform storing register 611 (Step S12), and stores the data as the data of the isolated wave. As described above, the isolated wave is extracted from the second reproduction signal.

Then, along the flow chart shown in FIG. 9, the motions of the reference signal-generating circuit 62, the wave form equalizing circuit 63 and the coefficient controlling circuit 64 shown in FIG. 6 will be described. When the isolated wave is extracted as described above, the reference signal-generating circuit 62 generates a reference signal S, using the extracted isolated wave. This reference signal S is a hypothetical waveform signal which would be obtained if the waveform of the isolated wave was ideally (optimumly) equalized, and determined experimentally.

That is, as described later, this reference signal S decides the equalizing characteristics (equalizing coefficient) of the waveform equalizing circuit 63, and it is ideal that the error rate of the reproduced signal is made minimum as this equalizing characteristics. Therefore, considering that the equalizing characteristics has a relativity to the waveform of the reference signal, the waveform of the reference signal S is decided experimentally so that the error rate becomes minimum when the waveform of the isolated wave is equalized, that is, the waveform of the isolated wave is ideally equalized (provided that, as the peak value, a peak value $d_m$ of the extracted isolated wave is used, as described later)

Thus, the reference signal S is experimentally decided. In this embodiment, the reference signal is decided as described below. That is, the reference signal-generating circuit 62 designates the peak value as the peak value $d_m$ (the lowest line in FIG. 7) of the data of the isolated wave stored in the isolated wave-storing register 614 (Step S100), and the value at the bit cycle on the front and back thereof as "$d_m/2$", and the value of the bit cycle on the front and back separated by 1 bit as "0", to generate the reference signal S. That is, thus decided reference signal S reflects the extracted characteristics of the isolated wave as the peak value.

Then, the waveform equalizing circuit 63 shown in FIG. 6 equalizes the waveform of the isolated wave extracted by the isolated wave-extracting circuit 61, using the equalizing coefficients $K1_N \sim K4_N$ decided by the coefficient controlling circuit 64 described later. This waveform equalizing circuit 63 is composed of, for example, a digital transversal filter or the like.

Then, the coefficient controlling circuit 64 controls the equalizing coefficient $K1_N \sim K4^N$ (N; positive integer), so that the equalizing error becomes the smallest. That is, the coefficient controlling circuit 64 sets $K1_N \sim K4^N$ as the initial value of the equalizing coefficients (Step S101), and initializes the equalizing coefficient of the waveform equalizing circuit 63. Then, the equalizing error/coefficient-storing register 643 sets the initial value of the smallest equalizing error-storing register D built therein to the largest value which this register can take (Step S102).

The waveform equalizing circuit 63 equalizes the waveform of the isolated wave using the initial value $K1_N \sim K4^N$ of the equalizing coefficient and outputs the signal $W_1$. The coefficient control circuit 64 stores the output $W_1$ in the output register 641. Then, the comparator 642 compares the peak phase of the signal $W_1$ stored in the output register 641 with the peak phase of the reference signal S (Step S103), and calculates the difference between the signal $W_1$ and the reference signal S to calculate the equalizing error $ER_1$ (Step S104). This equalizing error $ER_1$ is stored in the equalizing error-storing register E in the equalizing error coefficient-storing register 643, and the equalizing coefficient at this time is stored, corresponding to the coefficient-storing register F (Step S105).

Here, when the value of the equalizing error-storing register E in the equalizing error coefficient-storing register 643 is smaller than the value of the smallest equalizing error-storing register D (Step S106; YES), the contents of the smallest equalizing error-storing register D is replaced by the contents of the equalizing error-storing register E, and at the same time, the contents of the coefficient-storing register F is written in the smallest coefficient-storing register G (Step S107). That is, the contents of the smallest equalizing error-storing register D and the smallest coefficient-storing register G are renewed with the equalizing error smallest at that time and the equalizing coefficient giving this equalizing error, respectively.

Then, the coefficient control circuit 64 changes stepwisely the equalizing coefficients $K1_N \sim K4^N$ in a predetermined range and writes them in the coefficient storing register F in turn, and carries out an operation repeatedly for the equalizing error $ER_N$ similarly over the predetermined range (Step S108; NO~S103~S107~S108; YES). As a result, the smallest equalizing error and the equalizing coefficients $K1_{min} \sim K4_{min}$ giving this equalizing error are left in the smallest equalizing error-storing register D and the smallest coefficient-storing register G.

Then, the coefficient control circuit 64 fixes the equalizing coefficients $K1_{min} \sim K4_{min}$ which are left finally in the smallest coefficient-storing register G as the equalizing coefficient of the waveform equalizing circuit (Step S109). Thus fixed equalizing coefficients are held until the next start pulse is input (Step S110). Next, the switch SW1 shown in FIG. 6 is switched to the normal side (Step S111), then the waveform equalizing circuit 63 completes the serial motion for controlling the equalizing coefficient, and equalizes the waveform of the second reproduction signal as the normal signal, using thus determined equalizing coefficients.

Here, as described above, if the open loop control is adopted in which after the equalizing coefficients are set by changing it stepwisely within a predetermined range, and all the equalizing error are determined with respect to each equalizing coefficient, the smallest equalizing error is set, the motion is not completed due to the noise, drop out or the like, before the smallest equalizing error is specified, thereby the equalizing coefficient which gives a small equalizing error stably can be determined.

On the other hand, according to the feed-back control which sets the direction of the change of the equalizing coefficients in response to the increase/decrease of the output value, there may be a case where the equalizing error which is originally not the smallest is regarded as the smallest due to the noise or the like and the equalizing coefficient which gives this equalizing error is set, thus it is not always the optimum equalizing coefficient.

Referring back to FIG. 5, it is required to set the whole transfer function from the recording system to the reproduction system to "1" in order to reproduce the signal before being recorded in a recording medium without being affected by the transfer function. However, if it is assumed that the transfer function of the recording system is $(1+D^2)^{-1}$, and the transfer function of from the rotary magnetic head 1 to the automatic waveform equalizer 6 which constitute the reproduction system shown in FIG. 5 is 1–D, the transfer function up to the output of the automatic waveform equalizer 6 becomes $(1+D^2)^{-1} \times (1-D)$, and does not become "1". Therefore, in this case, a transfer function-adjusting circuit 7a having a transfer function of 1+D is connected to the post stage of the automatic waveform equalizing circuit 6 to make the transfer function of the whole system "1". Thereafter, the binary value-detecting circuit 7b shown in FIG. 5 works as the detection circuit shown in FIG. 1 to detect the digital signal.

In the embodiment described above, when the coefficient control circuit 64 controls the equalizing coefficients of the waveform equalizing circuit 63, the equalizing coefficients $K1_N \sim K4_N$ are changed stepwisely from the initial value within a predetermined range. But according to this method, since the equalizing coefficients are changed stepwisely over the whole area in a predetermined range, the number of operation of the equalizing error with respect to each equalizing coefficient increases.

Therefore, the number of operation of the equalizing error can be reduced by the following method.

First, as the first method, the equalizing coefficients $K1_s \sim K4_s$ when the standard waveform approximating to the isolated wave is input in advance are determined, and these equalizing coefficients are set as the initial value. In this case, if the input isolated wave is not different largely from the standard waveform, the equalizing coefficient which gives the smallest equalizing error approximates to the equalizing coefficient $K_s$. Therefore, the equalizing coefficients have only to be changed in a certain limited range around the initial value, hence the number of operation of the equalizing error can be reduced, and the time for processing can be shortened.

As the second method, in the above-mentioned first method, when the equalizing coefficient is shifted from the initial value, if the changed portion of the equalizing error exceeds a certain range, the equalizing coefficient is returned to the initial value, and an operation of the equalizing error is carried out by changing the equalizing coefficient in the opposite direction. According to the above first method, the range of the equalizing coefficient to be changed is set and the equalizing error is determined. According to the second method, however, the range of the equalizing error to be changed is further set, the number of operation can be further reduced to shorten the time for processing.

Next, in this embodiment described above, if the condition of the isolated wave is satisfied, it is regarded as the isolated wave uniformly, and the motion of the equalizing coefficient is controlled using the reference signal generated based on the isolated wave. However, the waveform of the isolated wave may be varied due to the change in the distance between the head and the tape, and noise. In this case, as a result, the waveform of the isolated wave becomes homogeneous with the one having the interference between the codes, and does not satisfy the definition of the isolated wave. The equalizing coefficient determined from such isolated waves cannot equalize the waveform distortion properly. Therefore, according to a method described below, the signal waveform resulting from such a noise can be removed from the isolated wave.

First, as the first method, a plurality of isolated wave-storing registers 614 shown in FIG. 6 are provided, and signals satisfying the condition of the isolated wave among the reproduction signals in a certain amount are stored in the plurality of isolated wave-storing registers 614, respectively. And, the average of them is taken and designated as the output of the isolated wave-storing registers 614.

In addition, the reference signal-generating circuit 62 generates the reference signal by inputting the signal obtained by taking the average. According to this method, even if a part of the waveform of the isolated waves changes, the changed amount is diluted as a result of taking the average.

In addition, as the second method, signals satisfying the condition of the isolated wave among the reproduction signals in a certain amount are stored in a plurality of isolated wave-storing registers 614, respectively. And, a signal having the largest peak level among them is designated as the isolated wave and output from the isolated wave-storing register 614. Namely, in general, when there is a fluctuation in the distance between the head and the tape, the peak level becomes small. Therefore, according to this method, an isolated wave different from the inherent isolated wave of the recording/reproduction system, in which the peak level thereof has decreased, can be excluded.

Moreover, as the third method, signals having a peak level not smaller than the predetermined value (for example, a 50% signal level of the output value of the A/D converter 5) are regarded as the isolated waves and taken into the isolated wave-storing register 614. According to this method, signals having a waveform whose peak level has drastically decreased can be excluded, as well as accidental signals such as noise or the like caused in the area where no signal is present originally can be excluded.

Next, when the first reproduction signal is sampled by the A/D converter 5, a peak may be off the point depending upon the phase of the sampling clock (system clock signal). In this case, the peak of the isolated wave becomes different from the original value, which affects the control of the equalizing coefficient, as described above.

Accordingly, another A/D converter is provided in parallel to the A/D converter 5, and with each A/D converter, the first reproduction signal is sampled in parallel using a sampling clock having the opposite phase. In this case, the one of the A/D converter 50 or 51 carries out the sampling, shifting the sampling clock by half cycle with respect to the other A/D converter. The A/D converter having the isolated wave with a larger peak among the two A/D converters 50 and 51 is adopted for sampling, and as a result, the peak of the first reproduction signal is not largely off the point, hence the peak of the isolated wave of the first reproduction signal is truly reflected by the second reproduction signal. Hence, the extraction accuracy of the isolated wave can be improved, and the motion of the automatic waveform equalizing circuit 6 can be stabilized further.

Next, the peak detection circuit 612 shown in FIG. 6 may detect a peak in an area where there is no signal originally due to the influence of a noise or the like and get into a jam. Therefore, this jam can be avoided according to the following method. That is, as the first method, when a Bitabi decoding is performed in the binary value-detecting circuit 8, a position where the condition of a pass changes is regarded as the peak, and nothing is regarded as the peak at any other positions.

Furthermore, as the second method, in a process that the PLL 9 shown in FIG. 5 generates a master clock signal from the first reproduction signal, for example, when a window signal which differentiates the first reproduction signal to mask the periphery of the peak is generated in order to detect the peak of the first reproduction signal, it is so set that a portion other than the window of this window signal (a portion to be masked) is not regarded as the peak.

By using these methods, a signal affected by a noise or the like can be excluded and a peak of the isolated wave can be correctly detected.

Figure 10:
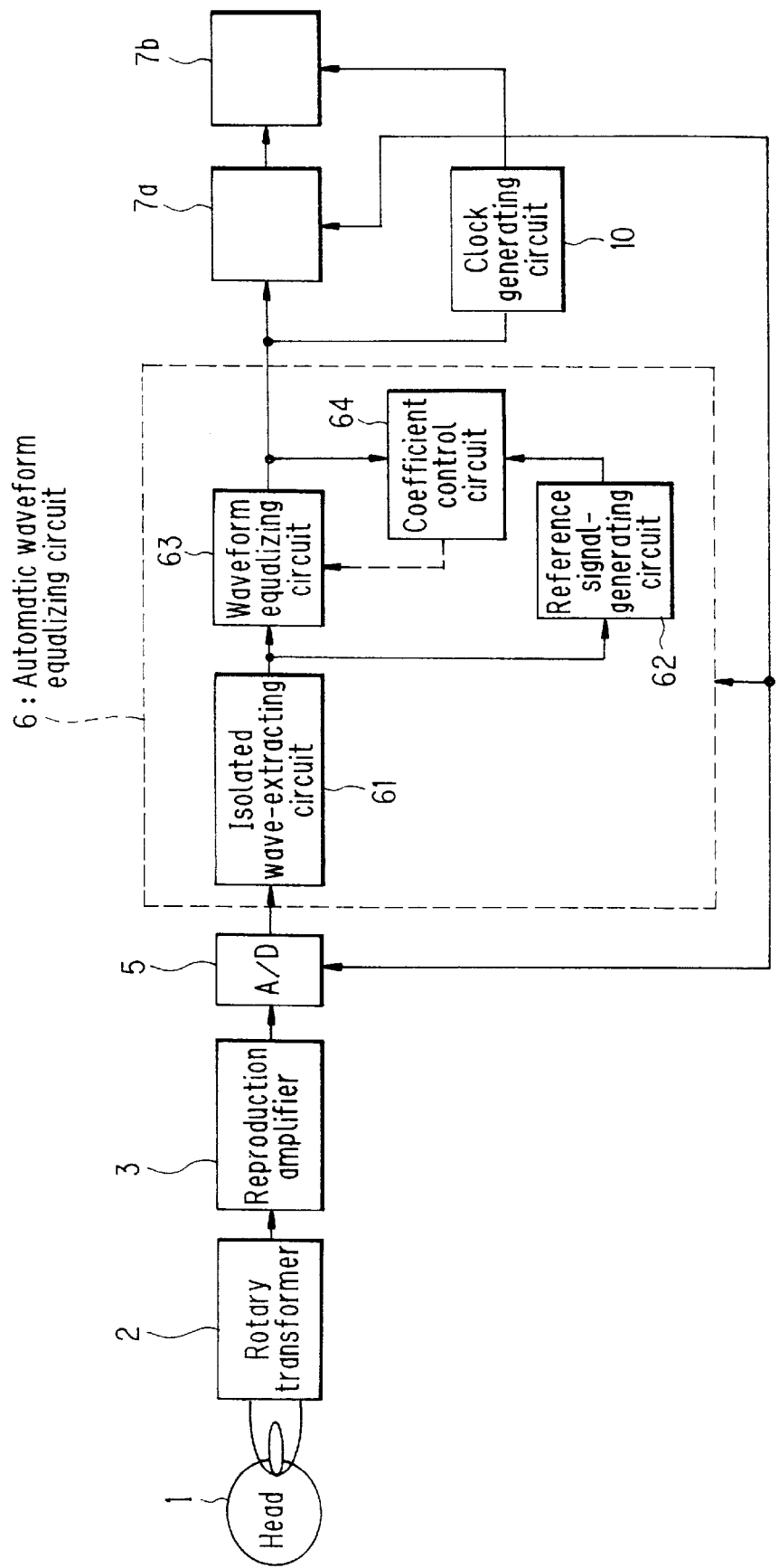
FIG. 10 is a block diagram showing the other structure example of the digital recording/reproduction apparatus having the waveform equalizer according to the embodiments of the present invention.

In the above-mentioned embodiment, as shown in FIG. 5, the clock generating circuit 9 is provided on the post stage of the fixed waveform-equalizing circuit 4, and the master clock signal for synchronizing the whole motion of the apparatus is generated from the first reproduction signal. However, as shown in FIG. 10, the clock generating circuit 10 for generating this master clock signal may be provided on the post stage of the automatic waveform equalizing circuit 6. Provided that, this clock generating circuit 10 is so constituted that since the output of the automatic waveform equalizing circuit 6 is in a digital amount, it generates a master clock signal synchronous to the peak position of a signal having this digital amount.

When the circuit for generating the master clock signal is provided on the post stage of the automatic waveform equalizing circuit 6, the fixed waveform-equalizing circuit 4 can be omitted, since the fixed waveform-equalizing circuit 4 shown in FIG. 5 is to stabilize the motion of the PLL 9, thus the circuit size can be reduced. In addition, if the output of the automatic waveform equalizing circuit 6 is passed through a low-pass filter, a clock generating circuit of an analog type, such as the clock generating circuit 9 shown in FIG. 5 may be used as the clock generating circuit 10.

As is obvious from the above description, according to the present invention, the following effects can be obtained.

That is, according to the waveform equalizer of the invention as set forth in the aspects 1 and 2, it is so formed that the equalizing coefficients are controlled according to the reproduction signal, hence the waveform can be equalized using a proper equalizing coefficient in accordance with the input reproduction signal.

According to the digital recording/reproduction apparatus having the waveform equalizer of the invention as set forth in the aspects 3 and 4, since it includes a waveform equalizer which equalizes the waveform properly in response to the input signal, even if the characteristics of the reproduction system such as a magnetic head or the like changes with the lapse of time, the waveform can be equalized and reproduced properly in accordance with the change of the characteristics.

According to the digital recording/reproduction apparatus having the waveform equalizer of the invention as set forth in the aspects 5~8 and 21~24, since the waveform is equalized after being A/D converted, the waveform equalizer can be made as a digital circuit, hence a waveform equalizing circuit having a high accuracy and high reliability can be realized.

According to the waveform equalizer of the invention as set forth in the aspects 9 and 10, since the equalizing coefficient is controlled in response to the reproduction signal so that the equalizing error is made minimum, an optimum equalizing coefficient can be set in response to the input reproduction signal.

According to the waveform equalizer of the invention as set forth in the aspects 11 and 12, since it is so formed that the equalizing error is stepwisely changed to determine the equalizing error by the open-loop control, it is not affected by the noise or the like, and an optimum equalizing coefficient can be set.

According to the waveform equalizer of the invention as set forth in the aspects 13 and 14, in the waveform equalizer as set forth in the aspect 1 or 2, since a value in which the equalizing error cannot become minimum is set as the initial value of the equalizing coefficient, the equalizing coefficient in which the equalizing error becomes minimum can be determined correctly.

According to the waveform equalizer of the invention as set forth in the aspects 15 and 16, in the waveform equalizer as set forth in the aspect 1 or 2, since the direction of the change of the equalizing coefficient is set based on the changed portion of the equalizing error, the number of operation of the equalizing error can be reduced, and the time for the operation can be shortened.

According to the waveform equalizer of the invention as set forth in the aspect 17, in the waveform equalizer as set forth in the aspect 1 or 2, since the average of a plurality of isolated waves is used to control the equalizing coefficient, the influence of a noise or the like can be excluded, and the equalizing coefficient can be set properly.

According to the waveform equalizer of the invention as set forth in the aspect 18, in the waveform equalizer as set forth in the aspect 1 or 2, since the wave having the largest peak level is extracted as the isolated wave, the influence of a noise or the like can be excluded, and the equalizing coefficient can be set properly.

According to the waveform equalizer of the invention as set forth in the aspects 19 and 20, in the waveform equalizer as set forth in the aspect 17 or 18, since the wave having a peak level not smaller than a predetermined value is extracted as the isolated wave, the influence of a noise or the like can be excluded, and the equalizing coefficient can be set properly.

What is claimed is:

1. A waveform equalizer which equalizes the waveform of a reproduction signal reproduced from a recording medium, comprising:

equalizing means for equalizing the waveform of said reproduction signal based on an equalizing coefficient;

reference signal-generating means for extracting an isolated wave from said reproduction signal, which is reproduced from a user recording area of the recording medium, to generate a reference signal based on said isolated wave; and equalizing coefficient control means for carrying out an operation of the equalizing error of the isolated wave of the reproduction signal whose waveform has been equalized by said equalizing means from said reference signal, to control said equalizing coefficient based on said equalizing error.

2. A waveform equalizer according to claim 1, wherein the equalizing coefficient control means controls so that the equalizing error becomes minimum.

3. A waveform equalizer according to claim 1, wherein the equalizing coefficient control means determines a plurality of equalizing errors by changing stepwisely said equalizing coefficient within a predetermined range, when it controls the equalizing coefficient of the equalizing means, and designates the equalizing coefficient in which the equalizing error is the smallest among said plurality of equalizing errors as the equalizing coefficient of said equalizing means.

4. A waveform equalizer according to claim 1, wherein a value in which the equalizing error cannot become the smallest is set as the initial value of the equalizing coefficient, a plurality of equalizing errors are determined by changing stepwisely said equalizing coefficient within a predetermined range including said initial value, and the equalizing coefficient in which the equalizing error is the smallest among said plurality of equalizing errors is designated as the equalizing coefficient of said equalizing means.

5. A waveform equalizer according to claim 1, wherein the equalizing coefficient control means changes said equalizing coefficient stepwisely from the initial value, when it controls the equalizing coefficient of the equalizing means, searches an equalizing coefficient in which the equalizing error is the smallest based on the changed portion of the equalizing error due to the stepwise change of said equalizing coefficient, to control the equalizing coefficient of said equalizing means.

6. A waveform equalizer that equalizes the waveform of a reproduction signal reproduced from a recording medium, comprising:

isolated wave-extracting means for extracting an isolated wave from said reproduction signal;

reference signal-generating means for generating a reference signal based on the isolated wave extracted by said isolated wave-extracting means;

selecting means for selecting either of the reproduction signal or the isolated wave extracted by said isolated wave-extracting means, based on a start pulse;

equalizing means for equalizing the waveform of the reproduction signal or the isolated wave selected by said selecting means based on an equalizing coefficient; and equalizing coefficient control means for controlling said equalizing coefficient based on an equalizing error of the isolated wave whose waveform has been equalized by said equalizing means from said reference signal.

7. A waveform equalizer according to claim 6, wherein the equalizing coefficient control means controls so that the equalizing error becomes minimum.

8. A waveform equalizer according to claim 6, wherein the equalizing coefficient control means determines a plurality of equalizing errors by changing stepwise said equalizing coefficient within a predetermined range, when it controls the equalizing coefficient of the equalizing means, and designates the equalizing coefficient in which the equalizing error is the smallest among said plurality of equalizing errors as the equalizing coefficient of said equalizing means.

9. A waveform equalizer according to claim 6, wherein a value in which the equalizing error cannot become the smallest is set as the initial value of the equalizing coefficient, a plurality of equalizing errors are determined by changing stepwise said equalizing coefficient within a predetermined range including said initial value, and the equalizing coefficient in which the equalizing error is the smallest among said plurality of equalizing errors is designated as the equalizing coefficient of said equalizing means.

10. A waveform equalizer according to claim 6, wherein the equalizing coefficient control means changes said equalizing coefficient stepwise from the initial value, when it controls the equalizing coefficient of the equalizing means, searches an equalizing coefficient in which the equalizing error is the smallest based on the changed portion of the equalizing error due to the stepwise change of said equalizing coefficient, to control the equalizing coefficient of said equalizing means.

11. A waveform equalizer according to claim 6, wherein the isolated wave-extracting means has a plurality of registers for temporarily storing a plurality of isolated waves extracted from the reproduction signal and outputs the mean value of the isolated wave levels stored in said plurality of registers as the level of the isolated wave extracted from said reproduction signal.

12. A waveform equalizer according to claim 11, wherein the isolated wave-extracting means extracts the isolated waves having a peak level not smaller than the predetermined value and stores said isolated waves in the register.

13. A waveform equalizer according to claim 6, wherein the isolated wave-extracting means has a plurality of registers for temporarily storing a plurality of isolated waves extracted from the reproduction signal and outputs the isolated wave having the largest peak level among the isolated waves stored in said plurality of registers, as the isolated wave extracted from said reproduction signal.

14. A waveform equalizer according to claim 13, wherein the isolated wave-extracting means extracts the isolated waves having a peak level not smaller than the predetermined value and stores said isolated waves in the register.

15. A digital recording/reproduction apparatus having a waveform equalizer comprising: signal detecting means for detecting a digital signal from a recording medium to output the signal as a reproduction signal; a waveform equalizer which equalizes the waveform of said reproduction signal; and binary value-forming means for converting the output of said waveform equalizer to a binary format to detect said digital signal, wherein said waveform equalizer comprises:

equalizing means for equalizing the waveform of said reproduction signal based on the equalizing coefficient;

reference signal-generating means for extracting an isolated wave from said reproduction signal, which is reproduced from a user recording area of the recording medium, to generate a reference signal based on said isolated wave; and equalizing coefficient control means for carrying out an operation of the equalizing error of the isolated wave of the reproduction signal whose waveform has been equalized by said equalizing means from said reference signal to control said equalizing coefficient based on said equalizing error.

16. A digital recording/reproduction apparatus having a waveform equalizer comprising:

signal detecting means for detecting a digital signal recorded on a recording medium to output the signal as a reproduction signal;

compensation means for compensating the phase or amplitude characteristic of said reproduction signal;

a waveform equalizer that equalizes the waveform of the reproduction signal compensated by said compensating means;

binary value-forming means for converting the output of said waveform equalizer to a binary format to detect said digital signal; and clock signal-generating means for generating a master clock signal that becomes a time reference for at least the waveform equalizer and the binary value-forming means, based on the reproduction signal compensated by said compensating means, wherein said waveform equalizer comprises:

isolated wave-extracting means for extracting an isolated wave from said reproduction signal;

reference signal-generating means for generating a reference signal based on the isolated wave extracted by said isolated wave-extracting means;

selecting means for selecting either of the reproduction signal or the isolated wave extracted by said isolated wave-extracting means, based on a start pulse;

equalizing means for equalizing the waveform of the reproduction signal or the isolated wave selected by said selecting means based on an equalizing coefficient; and equalizing coefficient control means for controlling said equalizing coefficient based on an equalizing error of the isolated wave whose waveform has been equalized by said equalizing means from said reference signal.

17. A digital recording/reproduction apparatus having a waveform equalizer comprising: signal detecting means for detecting a digital signal recorded on a recording medium to output the signal as a first reproduction signal; conversion means for quantizing the waveform of said first reproduction signal to convert the signal to a second reproduction signal; a waveform equalizer for equalizing the waveform of said second reproduction signal; and binary value-forming means for converting the output of said waveform equalizer to a binary format to detect said digital signal, wherein said waveform equalizer comprises:

equalizing means for equalizing the waveform of said second reproduction signal based on the equalizing coefficient;

reference signal-generating means for extracting an isolated wave from said reproduction signal, which is reproduced from a user recording area of the recording medium amongst said second reproduction signal, to generate a reference signal based on said isolated wave; and equalizing coefficient control means for carrying out an operation of the equalizing error of the isolated wave of the second reproduction signal whose waveform has been equalized by said equalizing means from said reference signal to control said equalizing coefficient based on said equalizing error.

18. A digital recording/reproduction apparatus having a waveform equalizer according to claim 17, wherein the conversion means samples the reproduction signals using a plurality of sampling signals having different phases to convert the waveform thereof to a plurality of digital signals, and the reference signal-generating means extracts respective isolated waves from said plurality of digital signals to generate a reference signal from the isolated wave having the largest peak level among said isolated waves.

19. A digital recording/reproduction apparatus having a waveform equalizer according to claim 17, wherein the equalizing means is composed of a digital transversal filter.

20. digital recording/reproduction apparatus having a waveform equalizer according to claim 17, wherein the equalizing coefficient control means sets the maximum value which the register storing said equalizing error can take as the initial value of the equalizing error obtained by carrying out an operation.

21. A digital recording/reproduction apparatus having a waveform equalizer comprising: signal detecting means for detecting a digital signal recorded on a recording medium to output the signal as a first reproduction signal; compensation means for compensating the phase or amplitude characteristic of said first reproduction signal; conversion means for quantizing the waveform of said first reproduction signal compensated by said compensation means to convert the waveform to a second reproduction signal; clock signal-generating means for generating a master clock signal which becomes a time reference of the whole motion based on the first reproduction signal compensated by said compensation means; a waveform equalizer which equalizes the waveform of said second reproduction signal; and binary value-forming means for converting the output of said waveform equalizer to a binary format to detect said digital signal, wherein said waveform equalizer comprises:

isolated wave-extracting means for extracting the isolated wave from said second reproduction signal; reference signal-generating means for generating a reference signal based on the isolated wave extracted by said isolated wave-extracting means;

selecting means for selecting either of the second reproduction signal obtained by converting the waveform with said conversion means or the isolated wave extracted by said isolated wave-extracting means, based on the start pulse;

equalizing means for equalizing the waveform of the second reproduction signal or the isolated wave selected by said selecting means based on the equalizing coefficient; and equalizing coefficient control means for controlling said equalizing coefficient based on the equalizing error of the isolated wave whose waveform has been equalized by said equalizing means from said reference signal.

22. A digital recording/reproduction apparatus having a waveform equalizer according to claim 21, wherein the conversion means samples the reproduction signals using a plurality of sampling signals having different phases to convert the waveform thereof to a plurality of digital signals, the isolated wave-extracting means extracts respective isolated waves from said plurality of digital signals and the reference signal-generating means generates a reference signal from the isolated wave having the largest peak level among said isolated waves extracted by said isolated wave-extracting means.

23. A digital recording/reproduction apparatus having a waveform equalizer according to claim 21, wherein the equalizing means is composed of a digital transversal filter.

24. A digital recording/reproduction apparatus having a waveform equalizer according to claim 21, wherein the equalizing coefficient control means sets the maximum value which the register storing said equalizing error can take as the initial value of the equalizing error obtained by carrying out an operation.

* * * * *